United States Patent [19]
Wankel

[11] Patent Number: 4,753,584
[45] Date of Patent: Jun. 28, 1988

[54] SINGLE-ROTATION MACHINE HAVING INTERNAL AND EXTERNAL ROTORS WITH AXIAL COOLING DUCTS FOR THE EXTERNAL ROTOR

[76] Inventor: Felix Wankel, Fraunhoferstrasse 10, D-8990 Lindau, Fed. Rep. of Germany

[21] Appl. No.: 912,402

[22] Filed: Sep. 25, 1986

[30] Foreign Application Priority Data

Oct. 8, 1985 [CH] Switzerland .................. 04334/85

[51] Int. Cl.$^4$ .................. F01C 1/10; F01C 21/06
[52] U.S. Cl. .................. 418/91; 418/101; 418/168
[58] Field of Search .................. 418/91, 88, 101, 168, 418/171

[56] References Cited

U.S. PATENT DOCUMENTS 3,112,870 12/1963 Bentele .................. 418/91
3,690,791  9/1972 Dieter .................. 418/101

Primary Examiner—John J. Vrablik
Assistant Examiner—Leonard P. Walnoha
Attorney, Agent, or Firm—Ladas & Parry

[57] ABSTRACT

The engagement parts of the external rotor of a single rotation are provided with at least one cooling air duct. The inflow takes place by an inflow duct provided in the casing side plate and which is surrounded by the antifriction bearing mounting the external rotor, while the outflow takes place radially through openings provided in the circumferential wall of the casing.

7 Claims, 4 Drawing Sheets

SINGLE-ROTATION MACHINE HAVING INTERNAL AND EXTERNAL ROTORS WITH AXIAL COOLING DUCTS FOR THE EXTERNAL ROTOR

BACKGROUND OF THE INVENTION

The invention relates to a single-rotation machine and particularly to a machine having internal axes and at least one rotor.

Numerous different single-rotation machine constructions are known. However, the heat removal from the rotors is inadequate for certain uses, where there is marked heating of the engaging rotors. In particular, no satisfactory solution is known for the cooling of the external rotor of single-rotation machines having internal axes.

SUMMARY OF THE INVENTION

It is a primary object of the present invention to provide a single-rotation machine which, on the basis of a relatively simple design, effectively cools the engagement parts of its external rotor.

In order to implement this object and still further objects of the invention, which will become apparent as the description proceeds, the invention is characterized in that at least one axially parallel cooling duct with an inflow opening and an outflow opening is provided for the rotor.

BRIEF DESCRIPTION OF THE DRAWINGS

The invention is described in greater detail hereinafter relative to non-limitative embodiments and the attached drawings, wherein the following is shown.

Figure 1:
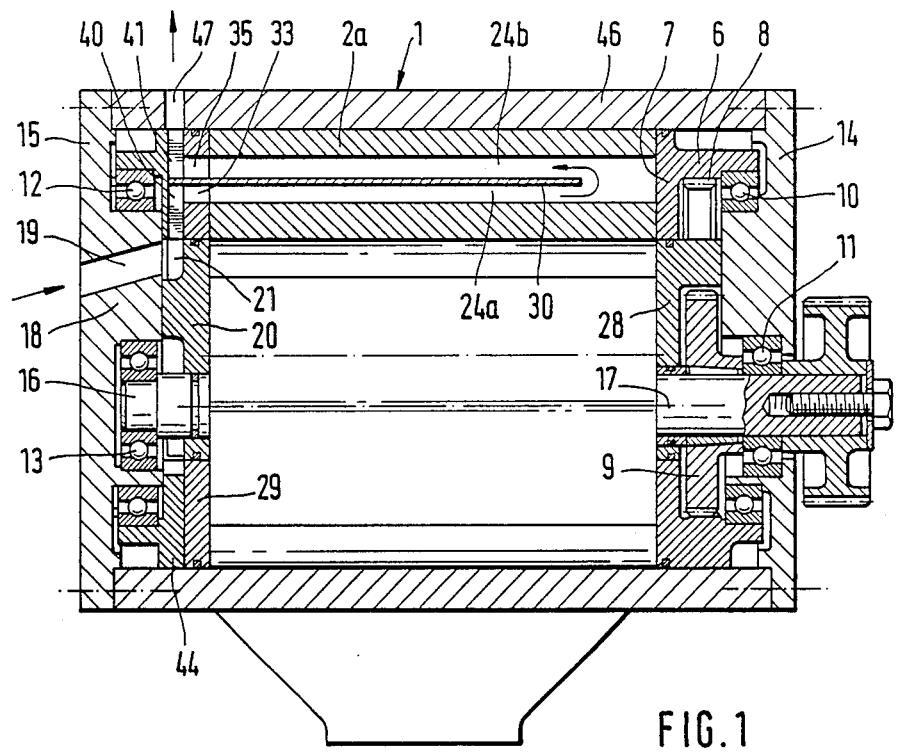
FIGS. 1 and 2 disclose an axial and a radial section respectively through an embodiment of a single-rotation machine having internal axes according to the invention.
Figure 2:
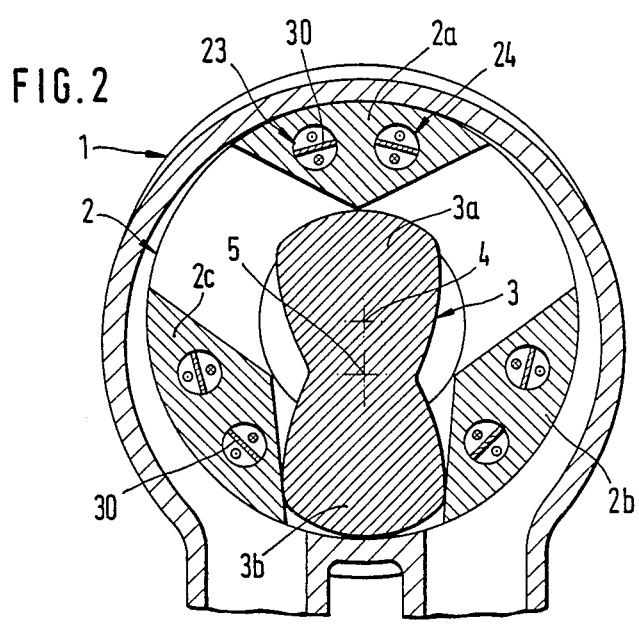

The single-rotation machine having internal axes represented in exemplified manner in FIGS. 1 and 2 has an external rotor 2 with three engagement parts 2a, 2b, 2c surrounded by a casing 1 and which in turn encloses an internal rotor 3 with two engagement parts 3a, 3b, so that said two rotors 2, 3 rotate with a speed ratio of 2:3 about their spaced axes 4, 5, which are fixed with respect to the casing 1.

At one axial end of the machine, the two rotors 2, 3 are in driving connection with one another via gears and for this purpose on a hub part 6 of an external rotor side wall 7 interconnecting engagement parts 2a, 2b, 2c is shaped a hollow gear 8, which surrounds in meshing manner a gear 9 connected to the internal rotor 3. The size ratio between the pitch circles of both gears 8, 9 corresponds to the speed ratio between both rotors and particularly in the case of speed ratios of 2:3, 3:4, 4:5, etc., the inner gear 9 covers a substantial part of the side of external rotor 2, so that the supply or removal of cooling air to external rotor 2 is made more difficult from this side. However, in order to still be able to cool engagement parts 2a, 2b, 2c of external rotor 2, according to FIGS. 1 to 8 the supply and removal of cooling air takes place on the side of external rotor 2 remote from the driving connection 8, 9, as will be described in greater detail hereinafter.

The antifriction bearings 10 to 13 provided on either side of rotors 2, 3 are supported on side plates 14, 15 of casing 1. The antifriction bearings 10, 12 mounting the external rotor 2 have a relatively large diameter, because they surround the antifriction bearings 11, 13 surrounding the journals 16, 17 of internal rotor 3 and account is also taken of the spacing between the axes of both rotors 2, 3. As a result of this spacing or the consequent lateral displacement of the surrounded antifriction bearing 13, the casing side plate 15 carrying antifriction bearings 12, 13 has a substantially unoccupied region 18, through which is passed a cooling air supply duct 19 in the embodiment according to FIG. 1. A gap 21 provided between side plate 15 and a sealing plate 20 parallel thereto permits the passing on of the cooling air towards the cooling air ducts 23, 24 (FIG. 1) or 25, 26 (FIG. 4), which are provided in engagement parts 2a, 2b, 2c of external rotor 2. The said sealing plate 20 seals the working spaces of the machine, as well as the facing sealing plate 28, in the axially outer direction and in a radial direction thereto is sealingly surrounded by the side wall 29 or 7 of the external rotor 2.

The cooling air ducts 23 to 26 are subdivided over a large part of their length by an inserted, thin partition 30, 31, so that they have in each case a partial duct 24a, 24b, 26a, 26b for the supply and removal of cooling air. This partition also subdivides the opening of the cooling air ducts provided at one axial end only into an inflow opening 33 or 34 and an outflow opening 35 or 36, which consequently pass through side walls 29 or 37 of the external rotor.

In the embodiment according to FIGS. 1 and 2, the cooling air ducts 23, 24 are drilled into the engagement parts 2a, 2b, 2c and consequently have a circular cross-section. According to the other embodiments (FIGS. 3 to 7), the cooling air ducts are shaped in during the casting process for manufacturing the engagement parts and simultaneously form cavities for reducing the weight of said engagement parts 2a, 2b, 2c which are exposed to strong centrifugal forces. Partitions 31 can also be placed in the casting mould beforehand and consequently cast therewith. According to FIG. 4, two cooling air ducts 25, 26 with an almost maximum cross-sectional size are juxtaposed in the circumferential direction and are separated from one another by a reinforcing web 38.

Figure 3:
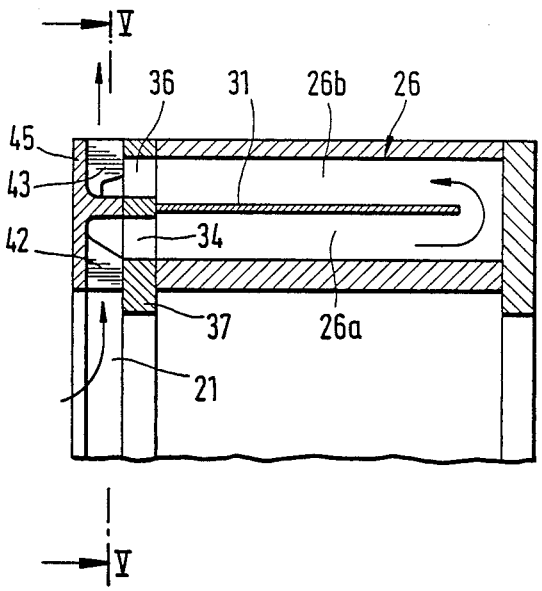
FIG. 3 disclose an axial partial cross-section through an embodiment of an external rotor of a single-rotation machine according to the invention.
Figure 4:
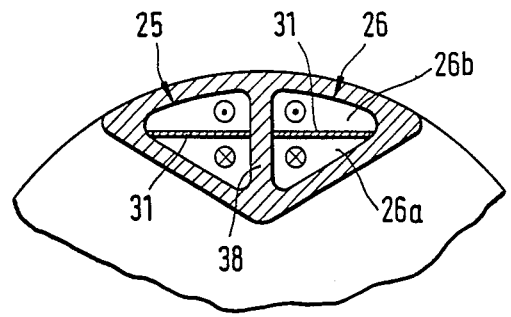
FIG. 4 discloses a radial section through an engagement part of the external rotor according to FIG. 3.
Figure 5:
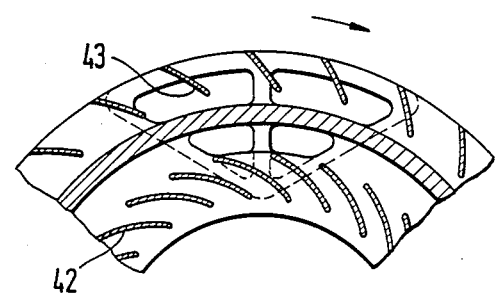
FIG. 5 discloses a further radial section along line V—V of FIG. 3.

For increasing the circulation of cooling air through the cooling air ducts, according to a preferred embodiment of the invention air feed blades 40, 41 or 42, 43 are provided upstream of or in the inflow and outflow openings of the partial ducts 24a, 24b or 26a, 26b and these are curved in the same way as conventional fan blades and can be juxtaposed circumferentially in groups in blade ring-like manner. These air feed blades can be held in an additional blade plate 44, 45 which, according to FIGS. 1 and 3, is fixed to the side wall 29 or 37 of external rotor 2 and has a correspondingly large opening for gap 21. Openings 47 are provided in circumferential wall 46 of casing 1 for the radially outwardly directed outflow of cooling air.

Figure 6:
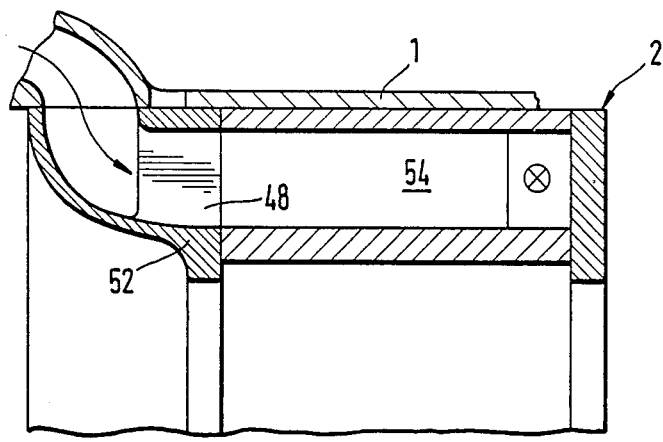
FIG. 6 disclose on view of a partial cross-section through a further embodiment of an external rotor with the adjacent casing wall.
Figure 7:
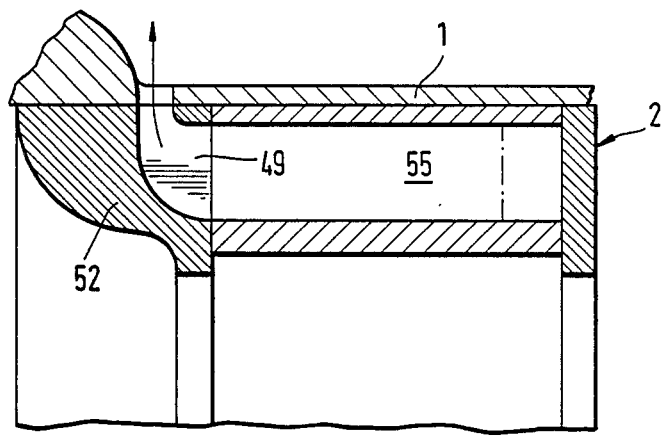
FIG. 7 discloses an axial view of a partial cross-section angularly displaced with respect to the partial cross-section of FIG. 6.
Figure 8:
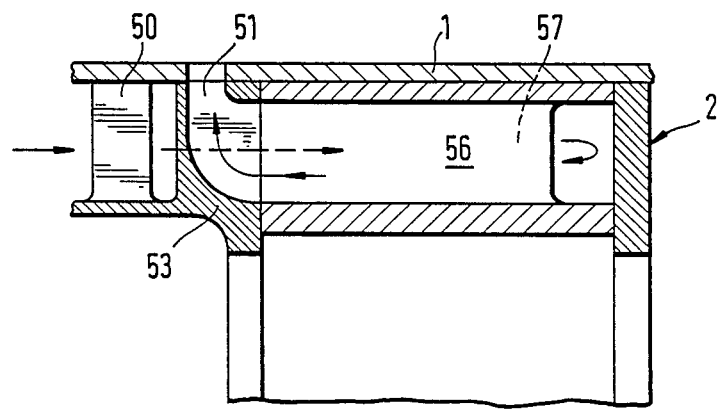
FIG. 8 discloses an axial view of a partial cross-section through a further embodiment of an external rotor with the adjacent casing wall.

According to the embodiments of FIGS. 6 and 7 the air feed blades 48, 49 or 50, 51 are provided in a blade ring 52 or 53, which also form the side wall of external rotor 2 carrying the engagement parts 2a, 2b, 2c. Furthermore, unlike in the previously described embodiment, the partial ducts 54, 55 or 56, 57 are juxtaposed in the circumferential direction of the external rotor 2 and consequently so are the air feed blades. According to FIG. 7, the air feed blades are also axially juxtaposed, so that inflow takes place axially and outflow radially outwards. In a not shown manner, the air feed blades can also be restricted to the outflow opening or to the inflow opening of the cooling air ducts.

Figure 9:
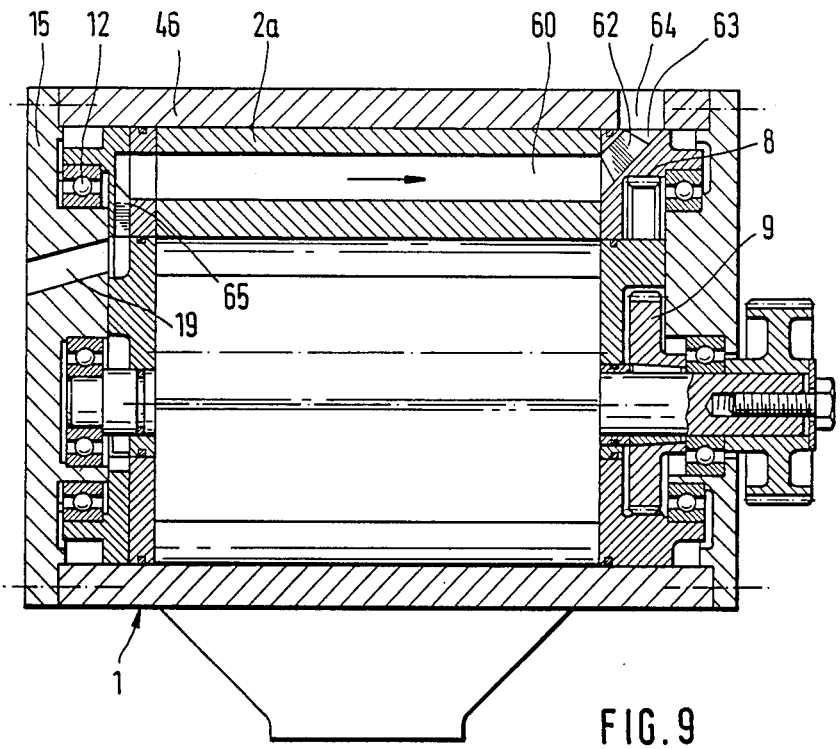
FIGS. 9 and 10 discloses an axial view of a and a radial section respectively through a further embodiment of a single-rotation machine.
Figure 10:
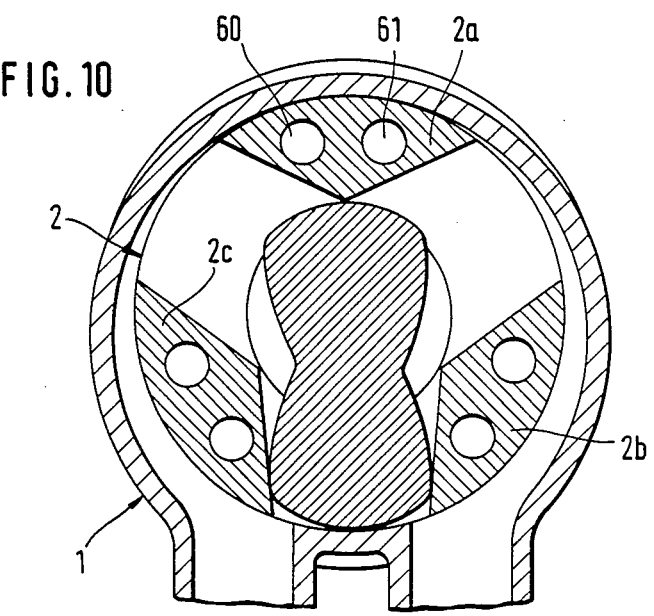

FIGS. 9 and 10 show an embodiment of the invention in which there is no deflection and return of the cooling air flow in that the cooling air ducts 60, 61 provided in each engagement part 2a, 2b, 2c are continuous and on the machine side carrying gears 8, 9 have a radially outwardly sloping outflow duct 63, which preferably also encloses the air feed blades 62 and leads to radially outwardly directed openings 64 in the circumferential wall 46 of casing 1.

As in the previously described embodiments, the inflow of cooling air advantageously takes place by means of a supply air duct 19 inside plate 15 of casing 1 within the antifriction bearing 12 mounting the external rotor 2 and is supported by air feed blades 65, so that in the direction of the cooling air ducts 60, 61 there is a centrifugal fanlike, radially outwardly directed inflow.

I claim:

1. A single-rotation machine having internal axes comprising:
   an internal and external rotor wherein at least said external rotor defines within itself a generally axially parallel air cooling duct having an inflow opening and an outflow opening; and
   at least one air feed blade provided adjacent at least one of said openings defined in said external rotor.

2. The single-rotation machine of claim 1 wherein there are a plurality of air feed blades which form a blade ring.

3. The single-rotation machine according to claim 1 further comprising:
   an air supply duct connected to said air cooling ducts;
   a casing generally encompassing said machine and through which said air supply duct passes;
   gears located opposite to said air supply duct in said machine; and
   anti-friction bearings mounting said external rotor and surrounding said air supply ducts.

4. The single-rotation machine of claim 1 further comprising:
   at least one partition for subdividing said at least one air supply duct over a major portion of its lengths to create partial ducts for the supply and removal of cooling air; and
   wherein said inflow and outflow openings are located on the side of said external rotor axially facing said gears.

5. The single-rotation machine of claim 4 further comprising:
   engagement parts, said engagement parts being part of said external rotor and being cast hollow bodies whose cavities enclose said partition.

6. The single-rotation machine of claim 1 further comprising:
   blade plates for carrying said air feed blades, said blade plates being fixed to the side of said external rotor.

7. The single-rotation machine of claim 5 wherein said air feed blades are part of a blade ring which interconnects said engagement parts of said external rotor.

* * * * *